(12) United States Patent
Endo et al.

(10) Patent No.: US 8,339,485 B2
(45) Date of Patent: Dec. 25, 2012

(54) APPARATUS, METHOD AND COMPUTER READABLE STORAGE MEDIUM OUTPUTTING A PROCESSED SIGNAL HAVING CORRECTED GAMMA VALUES TO A LOCATION BASED ON A USER INDICATION

(75) Inventors: Kazuo Endo, Kanagawa (JP); Mitsutoshi Shinkai, Kanagawa (JP)

(73) Assignee: Sony Corporation, Tokyo (JP)

( * ) Notice: Subject to any disclaimer, the term of this patent is extended or adjusted under 35 U.S.C. 154(b) by 503 days.

(21) Appl. No.: 12/401,248

(22) Filed: Mar. 10, 2009

(65) Prior Publication Data

US 2009/0256935 A1    Oct. 15, 2009

(30) Foreign Application Priority Data

Apr. 9, 2008   (JP) .................................. 2008-101976

(51) Int. Cl.
H04N 5/202    (2006.01)
(52) U.S. Cl. ...................... 348/254; 348/222.1; 348/362
(58) Field of Classification Search .................. 348/254, 348/234, 222.1, 229.1, 221.1, 362, 274; 382/274
See application file for complete search history.

(56) References Cited

U.S. PATENT DOCUMENTS

| | | | |
|---|---|---|---|
| 2004/0041928 A1 | 3/2004 | Hirakoso et al. | |
| 2005/0053280 A1* | 3/2005 | Nishikawa | 382/167 |
| 2006/0146164 A1* | 7/2006 | Mori et al. | 348/311 |
| 2006/0274164 A1* | 12/2006 | Kimura et al. | 348/231.3 |
| 2006/0284895 A1* | 12/2006 | Marcu et al. | 345/690 |
| 2007/0047033 A1 | 3/2007 | Furui | |
| 2007/0053607 A1* | 3/2007 | Mitsunaga | 382/274 |

FOREIGN PATENT DOCUMENTS

| | | |
|---|---|---|
| JP | 63-20770 | 1/1988 |
| JP | 5-30456 | 2/1993 |
| JP | 5-297844 | 11/1993 |
| JP | 2004-23605 | 1/2004 |
| JP | 2007-60393 | 3/2007 |
| JP | 2007-180892 | 7/2007 |

\* cited by examiner

*Primary Examiner* — Nelson D. Hernández Hernández
(74) *Attorney, Agent, or Firm* — Oblon, Spivak, McClelland, Maier & Neustadt, L.L.P.

(57) ABSTRACT

A video signal processing apparatus includes a user interface unit, a gamma correction value calculating unit, and a gamma correction value storage unit. The user interface unit receives a designation of values of at least three points that form a gamma curve used during gamma correction of a video signal. The gamma correction value calculating unit calculates gamma correction values by substituting coefficients, obtained by an approximation calculation carried out on the values of the at least three points, whose designation is received by the user interface unit, into an exponential function using the coefficients as parameters. The gamma correction value storage unit stores the gamma correction values calculated by the gamma correction value calculating unit and is operable when an indication confirming the gamma correction values has been received from the user, to output the gamma correction values to a gamma correction unit carrying out processing for gamma correction.

13 Claims, 10 Drawing Sheets

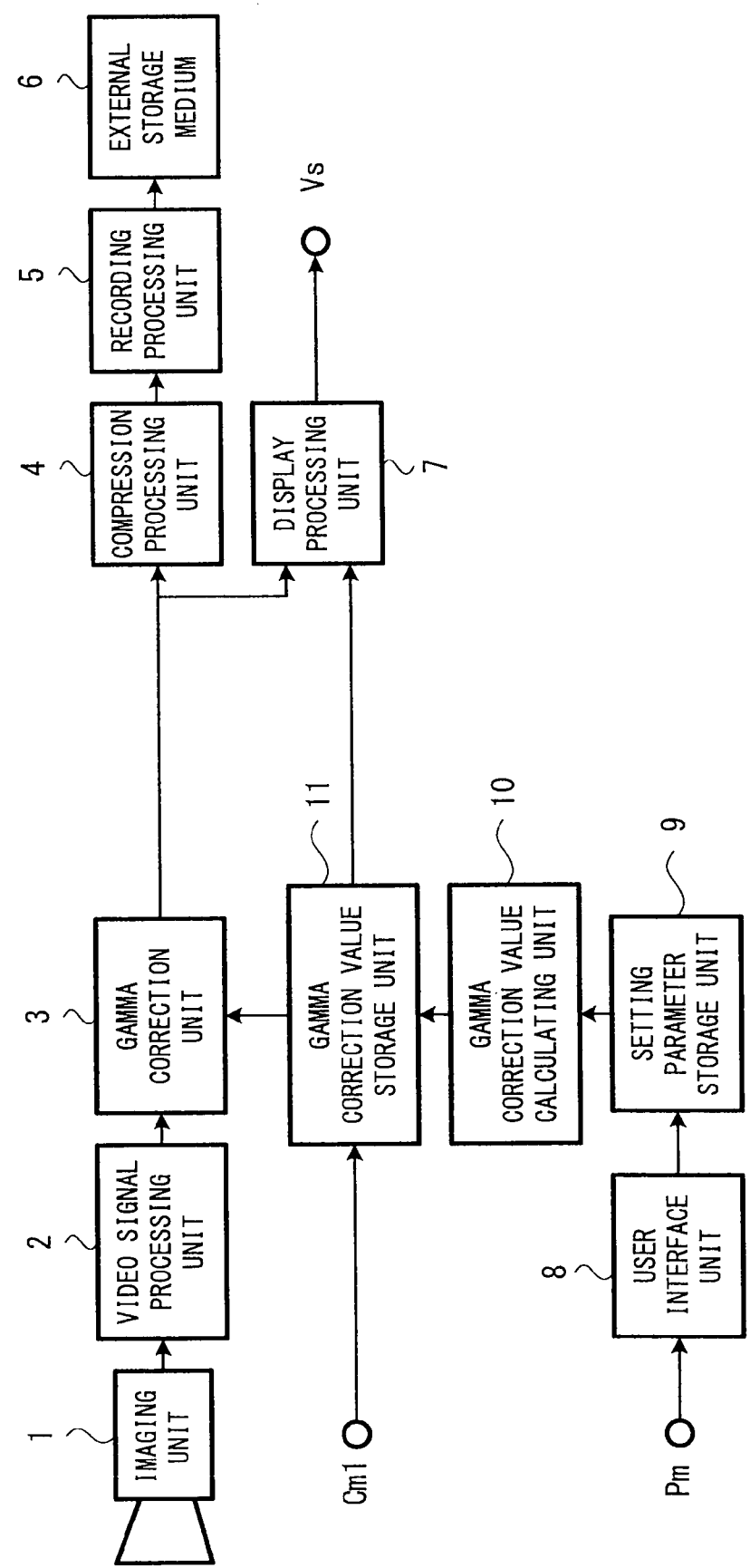

FIG. 8

```
GAMMA MODIFICATION PARAMETERS

BASE CURVE y=x^γ

(A) CAMERA D-RANGE      800%
(B) WHITE LIMIT         109%
(C) BLACK LEVEL           3%
(D) INITIAL GAIN          *5
(E) 18% GRAY LEVEL       50%
(F) MASTER GAIN          0dB
```

APPARATUS, METHOD AND COMPUTER READABLE STORAGE MEDIUM OUTPUTTING A PROCESSED SIGNAL HAVING CORRECTED GAMMA VALUES TO A LOCATION BASED ON A USER INDICATION

BACKGROUND OF THE INVENTION

1. Field of the Invention

The present invention relates to a video signal processing apparatus, an imaging apparatus, a video signal processing method, and a computer program, and in particular to a technology for adjusting a gamma curve used during gamma correction.

2. Description of the Related Art

Although display apparatuses such as CRT (Cathode Ray Tubes) and LCD (Liquid Crystal Displays) display images in accordance with an inputted video signal, even when the same image is displayed by different display apparatuses, the brightness and chroma of the image displayed on the screen may differ between apparatuses. This is because gamma characteristics that express the luminance reproduction characteristics during photoelectric conversion may differ due to factors such as the type of elements that form the screens of the display apparatuses. For this reason, gamma correction that adjusts the respective tone values of an input image to suitable values for the gamma characteristics is carried out so as to reproduce the luminances of the original image on a display apparatus.

Gamma characteristics are expressed by a gamma curve that shows the ratio of the brightness of outputted video to the signal level of inputted video. Therefore, to carry out gamma correction, the gradient of the gamma curve is adjusted in advance with consideration to the input/output characteristics of the display apparatus and the tone values in the input video signal are converted in accordance with the adjusted gamma curve.

In recent years, demand has also emerged for a technology capable of changing the tone reproduction of images displayed on the screen of a display apparatus, such as a change in accordance with the type of scene being reproduced by images. In such case also, the intended color reproduction is achieved by adjusting the gamma curve.

For example, Japanese Unexamined Patent Application Publication No. 2007-60393 discloses a technology that makes it possible to change the positions of a number of points that form a gamma curve by moving sliders, and carries out gamma correction using the adjusted gamma curve.

SUMMARY OF THE INVENTION

When the signal level of an input video signal is expressed as x, the luminance of the output video signal as y, and a gamma value produced by quantifying the gamma characteristics as $\gamma$, the gamma curve described above is expressed by the equation $y=x^{\gamma}$. That is, the gamma curve is formed by an exponential function. However, when adjustment of the gamma curve by the user is permitted, as with the technology disclosed in Japanese Unexamined Patent Application Publication No. 2007-60393 for example, the shape of the gamma curve may change when an adjustment operation is carried out. In such case, interpolation processing is typically carried out to smoothly join the modified points with the other points that form the gamma curve. Due to such interpolation processing being carried out, the equation that forms the gamma curve will also change, and as a result, the gamma curve will cease to be a curve that can be expressed by an exponential function.

When the gamma curve is not an exponential function, there is the problem of image deterioration in the images produced by a corrected video signal, such as tone jumps where the difference in luminance between adjacent tones is greater than necessary and unnatural coloration where colors that were not present in the original image are used.

It is desirable to provide a video signal processing apparatus in which a gamma curve can be adjusted without causing deterioration in the image quality of a video signal.

According to an embodiment of the present invention, there is provided a video signal processing apparatus. The video signal processing apparatus includes: a user interface unit, a gamma correction value calculating unit, and a gamma correction value storage unit. The user interface unit is configured to receive a designation of values of at least three points that form a gamma curve to be used during gamma correction of a video signal. The gamma correction value calculating unit is configured to calculate gamma correction values by substituting coefficients, which are obtained by an approximation calculation carried out on the values of the at least three points, designation of which is received by the user interface unit, into an exponential function that uses the coefficients as parameters. The gamma correction value storage unit is configured to store the gamma correction values calculated by the gamma correction value calculating unit and is operable when an indication that confirms the gamma correction values has been received from the user, to output the gamma correction values to a gamma correction unit that carries out processing for gamma correction.

Accordingly, the gamma curve used during gamma correction of a video signal will follow an exponential function.

According to an embodiment of the present invention, since the gamma curve used during gamma correction of a video signal will follow an exponential function, there will be no deterioration in image quality of the video signal after gamma correction.

BRIEF DESCRIPTION OF THE DRAWINGS

FIG. 1 is a block diagram showing one example of the internal configuration of an imaging apparatus according to an embodiment of the present invention.

FIG. 8 is a diagram useful in explaining another example configuration of a user interface screen according to an embodiment of the present invention.

DESCRIPTION OF THE PREFERRED EMBODIMENTS

Figure 2A:
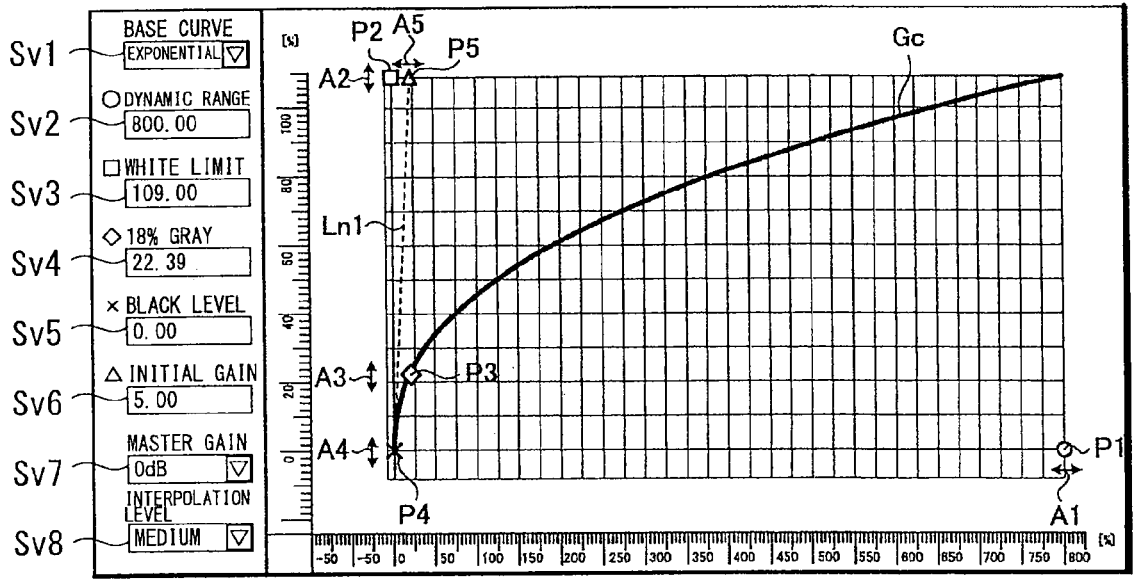
FIGS. 2A and 2B are diagrams showing example configurations of setting screens for a gamma curve according to an embodiment of the present invention, with FIG. 2A showing an example screen where a base curve is calculated using an exponent and FIG. 2B showing an example screen where a base curve is calculated using an logarithm.

Preferred embodiments of the present invention will now be described with reference to the attached drawings. FIG. 1 is a diagram showing one example of the internal configuration of an imaging apparatus according to an embodiment of the present invention. An imaging apparatus 100 shown in FIG. 1 includes an imaging unit 1 having an optical system that introduces light from a subject into the imaging apparatus and an imager that subjects the introduced light from the subject to photoelectric conversion to obtain a video signal. The imaging apparatus 100 further includes a video signal processing unit 2 that subjects the video signal obtained by the imaging unit 1 to signal processing and a gamma correction unit 3 that subjects the video signal that has been subjected to signal processing by the video signal processing unit 2 to gamma correction.

In addition, the imaging apparatus 100 includes a compression processing unit 4 that subjects the video signal that has been subjected to gamma correction by the gamma correction unit 3 to compression processing, a recording processing unit 5 that carries out processing to record the video signal compressed by the compression processing unit 4 onto a recording medium, and an external storage medium 6.

The imaging apparatus 100 also includes a user interface unit 8 that receives an input, such as setting parameters Pm for forming the gamma curve, from the user and a setting parameter storage unit 9 that stores the setting parameters Pm inputted via the user interface unit 8. As further components, the imaging apparatus 100 includes a gamma correction value calculating unit 10 that calculates gamma correction values using the setting parameters Pm stored in the setting parameter storage unit 9 and a gamma correction value storage unit 11 that stores the gamma correction values calculated by the gamma correction value calculating unit 10.

The video signal processing unit 2 carries out black shading correction that corrects inconsistencies in black caused by fluctuations in the dark current or the characteristics of the power supply circuit (not shown) and white shading correction that corrects color inconsistencies caused by the photoelectric conversion processing carried out by the imager (not shown). The video signal processing unit 2 also carries out white balance processing that adjusts the color temperature of the light from the subject and flare correction that corrects flare caused by irregular reflection of light or the like within the optical system.

The video signal processing unit 2 also carries out edge enhancement processing for enhancing edge portions in the images to be displayed on the screen of a display unit (not shown) and matrix processing for eradicating differences between chroma points determined by a video standard and chroma points in the imaging apparatus. The video signal processing unit 2 also carries out knee correction that compresses a high-level portion of the video signal so as to fall within the level of a video standard.

The gamma correction unit 3 carries out gamma correction on the video signal outputted from the video signal processing unit 2 using the gamma correction values outputted from the gamma correction value storage unit 11. The compression processing unit 4 compresses the video signal that has been subjected to gamma correction based on a standard such as MPEG2 (Moving Picture Experts Group 2) or MPEG4, for example.

The recording processing unit 5 records a video signal in the external storage medium 6 at a position and in a format that will facilitate access to the video signal when the video signal is read out and reproduced from the external storage medium 6. A display processing unit 7 converts the video signal that has been subjected to gamma correction by the gamma correction unit 3 to a data format based on a video standard, such as SDI (Serial Digital Interface), and outputs the resultant data to the display unit, not shown.

The user interface unit 8 includes a display unit with a touch panel function, and/or buttons and the like, none of which is shown. The user interface unit 8 receives, from the user, a setting of an output ratio for a black level portion of the video signal, a setting of an output ratio for an intermediate tone portion of the video signal, a setting of a dynamic range of an input video signal, and a setting of a white clip level of an output video signal. The user interface unit 8 also receives a setting of a master gain value and a selection of whether a base curve for the gamma curve is to be calculated using an exponential function or a logarithmic function. Note that the user interface unit 8 will be described in detail later in this specification.

The setting parameter storage unit 9 stores the various set values described above that have been inputted via the user interface unit 8 as the setting parameters Pm. The gamma correction value calculating unit 10 calculates gamma correction values using the setting parameters Pm stored in the setting parameter storage unit 9. The gamma correction value storage unit 11 stores the gamma correction values calculated by the gamma correction value calculating unit 10 until a "gamma correction value setting command signal Cm1" that confirms the values of the gamma correction values is received. The gamma correction value storage unit 11 outputs the stored gamma correction values to the gamma correction unit 3 when the gamma correction value setting command signal Cm1 is inputted.

Figure 2B:
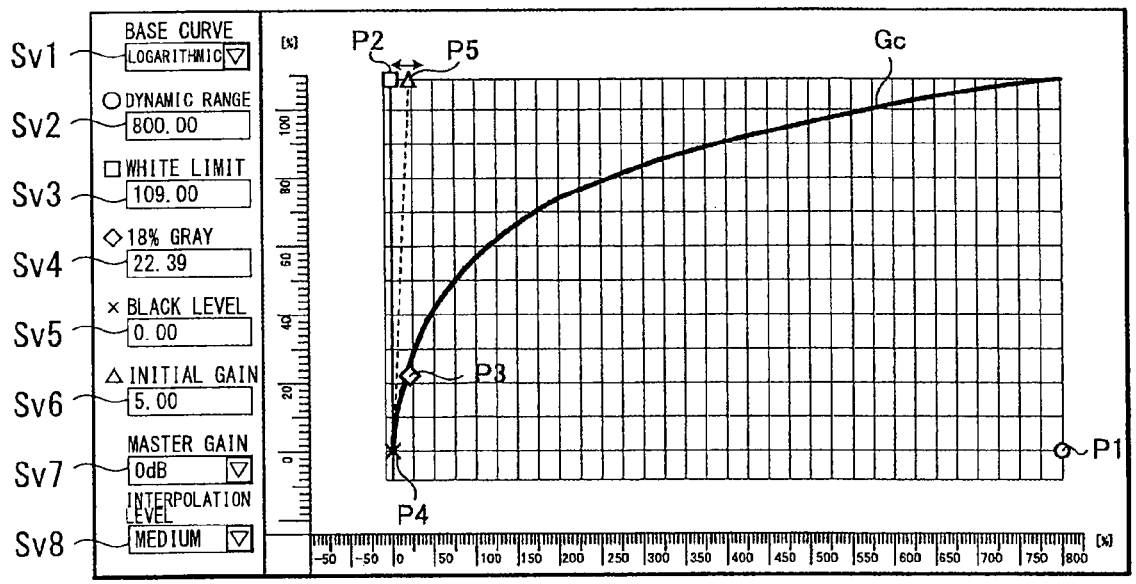

Next, example configurations of setting parameter receiving screens of the user interface unit 8 will be described with reference to FIGS. 2A to 4. The left side of each of the screens shown in FIGS. 2A and 2B is a region where inputs or selections of the various setting parameters are received, and the right side is a region where adjustment operations for a gamma curve are received via a GUI (Graphical User Interface). In each graph shown on the right side, the horizontal axis shows the input (%) and the vertical axis shows the output (%). The curve drawn in this graph is the gamma curve Gc and by moving the positions of a number of adjustment points provided in the graph, it is possible to change the shape of the curve.

The adjustment points in the graph respectively correspond to various setting parameters shown in the region on the left. That is, when the value of a setting parameter has been inputted in the region on the left, the position of an adjustment point corresponding to such item moves in the graph region on the right in accordance with the inputted value. Also, when the position of a specified adjustment point has changed in the graph region on the right, the value of a setting parameter of the item corresponding to such adjustment point changes in the region on the left in accordance with the movement of the point.

The items shown in the region on the left are described in order from the top. A listbox Sv1 where the type of base curve can be selected is located at the topmost position. Here, there are two types of base curve, a curve expressed by an exponential function and a curve expressed by a logarithmic function, and by having the user select one of such types displayed in a list, the equation used when generating the base curve is determined. Note that although an example where there are two types of base curve, "exponential function" and "logarithmic function", is given in the present embodiment, the type of functions are not limited to these two types. For example, it is also possible to use a base curve that is a combination of different exponential functions or the like.

In FIG. 2A, a gamma curve Gc as initial setting values is shown for the case where a curve expressed by an exponential function (displayed as "exponential" in the listbox Sv1) has been selected as the base curve. In FIG. 2B, a gamma curve Gc as initial setting values is shown for the case where a curve expressed by a logarithmic function (displayed as "logarithmic" in the listbox Sv1) has been selected as the base curve. The equations that use the respective functions will be described later. Since the function that generates the base curve differs, the gamma curve Gc shown in FIG. 2A and the gamma curve Gc shown in FIG. 2B differ in shape.

The gamma curve Gc is generated based on the gamma curve line Gc1 as a first curve and a straight line Ln1. The gamma curve line Gc1 is a curve calculated based on a set value of the black level, a set value of the output level of 18% gray, a set value of the white limit, and a set value of the dynamic range. In FIGS. 2A and 2B, since the curve of the gamma curve line Gc1 and the curve of the gamma curve Gc are the same, the two curves are shown by a single line described as Gc. The straight line Ln1 sets the gradient of a rising part of the gamma curve Gc, and the gradient of the straight line Ln1 is determined based on a value set as the "initial gain", described later.

In a textbox Sv2 that is second from the top in the region on the left in FIGS. 2A and 2B, input of a set value of dynamic range that sets a reproduction level as a percentage of the input is received. In a textbox Sv3 positioned therebelow, input of a value of the white limit (white clip level) is received. A maximum coordinate on the horizontal axis for the gamma curve Gc is determined by the set value of the input dynamic range, and a maximum coordinate on the vertical axis for the gamma curve Gc is determined by the set value of the white limit.

In the graph region on the right, an adjustment point P1 for adjusting the set value of the dynamic range is indicated by a circular mark and is configured to be movable in the horizontal direction as shown by the arrow A1 in FIG. 2A. The movable range of the adjustment point P1 is set in a range from 100% to 1000%. An adjustment point P2 for adjusting the set value of the white limit is indicated by a square mark and is movable in the vertical direction as shown by the arrow A2 in FIG. 2A. The movable range of the adjustment point P2 is set at 0% to 109%.

In a textbox Sv4 that is labeled "18% gray" and is positioned fourth from the top, input of a set value that determines, as a percentage, the output of a video signal of an intermediate tone with 18% reflectance is received. In a textbox Sv5 that is labeled "black level" and is positioned therebelow, input of a set value that determines, as a percentage, the output of a video signal of a black level is received. A gamma correction value for a case where the input is 18% is determined by the set value of "18% gray", and a gamma correction value for a case where the input is 0% is determined by the set value of the "black limit". Note that although the output for the case where the input is 0% is designated as "black level" in the present embodiment, it is possible to use another value, such as 5%.

In the graph region on the right, the adjustment point P3 for adjusting the set value of "18% gray" is indicated by a diamond-shaped mark and is movable in the vertical direction in the graph as shown by the arrow A3. The movable range of the adjustment point P3 is set as equal to or higher than the set value of the black level and equal to or lower than the set value of the white limit. The adjustment point P4 for adjusting the set value of "black level" is indicated by a cross-shaped mark and is configured to be movable in the vertical direction in the graph as shown by the arrow A4. The movable range of the adjustment point P4 is set in a range of 0% to 10%. Note that although 18% gray is used as a setting parameter for calculating the gamma correction values used for an intermediate tone portion of the video signal in the present embodiment, it is also possible to use other values, such as 70% (i.e., skin tone).

In a textbox Sv6 that is sixth from the top in the region on the left, input of a value of initial gain that determines a gradient of a rising part (dark part) of the gamma curve Gc is received. In the graph region on the right, the adjustment point P5 for adjusting a value of initial gain is shown by a triangular mark and is movable in the horizontal direction in the graph as shown by the arrow A5. The movable range is set as a range of "×1" (times one) to "×9" (times nine). Note that the movable ranges described above (i.e., the ranges of the set values) are not limited to the values given above, and may be set at other values.

According to the embodiment, when the gradient of the gamma curve line Gc1 is steeper than the gradient of the straight line Ln1, it is possible for the user to set the type of curve to be used as the curve of the rising part of the gamma curve Gc. This setting can be carried out using the listbox Sv8 that is labeled "interpolation level" and is positioned at the bottom in the region on the left of the screen.

Here, "off", "low", "medium", and "high" are provided as selections of the "interpolation level". When "off" is selected, the straight line Ln1 is used in a range from the adjustment point P4 that is a start point of the straight line Ln1 to an intersection P between the straight line Ln1 and the gamma curve line Gc1. When a set value aside from "off" has been selected, the curve in the rising part of the gamma curve Gc is adjusted so as to gradually change from the gradient of the straight line Ln1 to the gradient of the gamma curve line Gc1. That is, interpolation processing is carried out for the part where there is a switch from the straight line Ln1 to the gamma curve line Gc1. The range where such interpolation processing is applied is determined according to the level that has been selected as the "interpolation level".

Figure 3A:
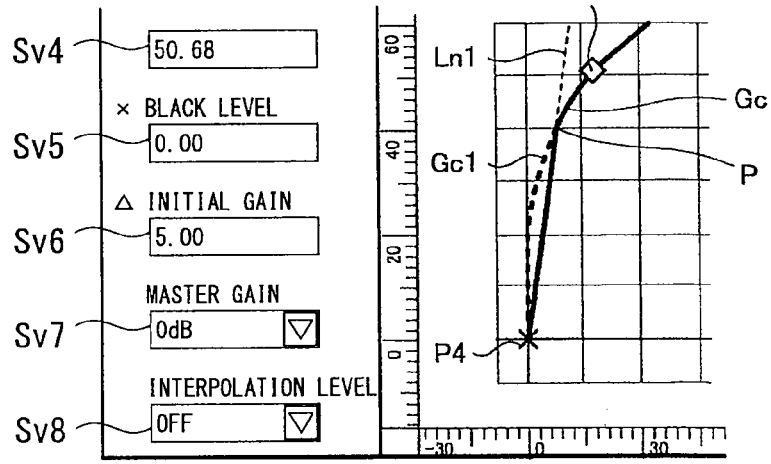
FIGS. 3A to 3C are diagrams useful in explaining example selections of an interpolation range according to an embodiment of the present invention, with FIG. 3A showing an example where interpolation processing is not carried out, FIG. 3B showing an example where the interpolation level has been set at "low", and FIG. 3C showing an example where the interpolation range has been set at "high".
Figure 3B:
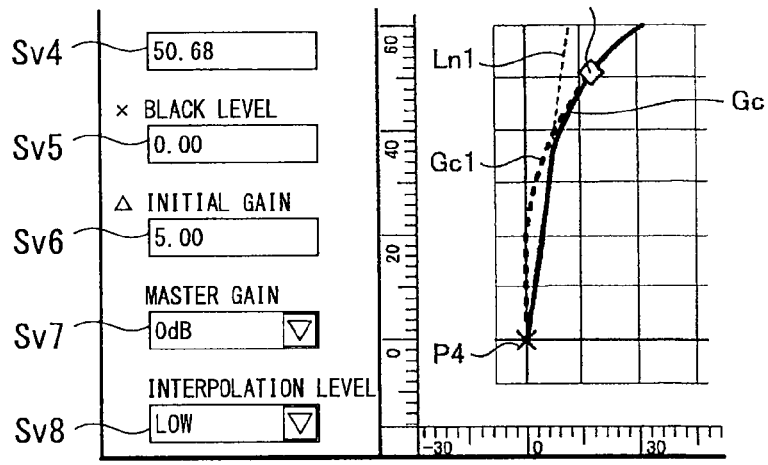
Figure 3C:
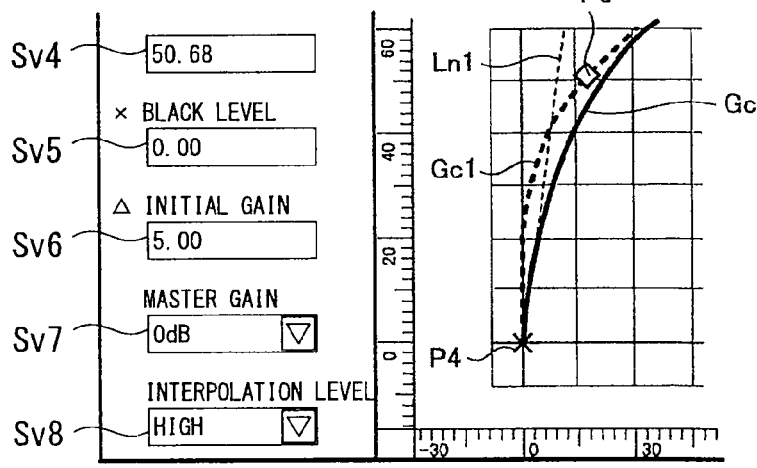

FIGS. 3A to 3C show examples of interpolation processing for different settings of the interpolation level. FIG. 3A shows an example when "off" has been selected as the "interpolation level". When the "interpolation level" is "off", that is, when a setting is made so that interpolation is not carried out, the straight line Ln1 is used from the adjustment point P4 to the intersection P between the straight line Ln1 and the gamma curve line Gc1, and the gamma curve line Gc1 is used from the intersection P onwards. That is, in this case, the gamma curve Gc used during gamma correction is formed with the straight line Ln1 and the gamma curve line Gc1.

FIG. 3B shows an example of interpolation processing for the case where "low" has been selected as the "interpolation level". When the "interpolation level" is "low", that is, when a setting is made so that the interpolation range is narrow, the straight line Ln1 that starts at the adjustment point P4 becomes a curve from a point just before the intersection P and is gradually connected to the gamma curve line Gc1. FIG. 3C shows an example of interpolation processing for the case where "high" has been selected as the "interpolation level". When the "interpolation level" is "high", that is, when a setting is made so that the interpolation range is wide, the straight line Ln1 that starts at the adjustment point P4 becomes a curve from a point well before the intersection P and is gradually connected to the gamma curve line Gc1. That is, in the examples shown in FIGS. 3B and 3C, the gamma curve Gc is formed of the straight line Ln1, a curve generated by the interpolation processing, and the gamma curve line Gc1. Note that the interpolation processing is described later in detail.

In the region on the left of the screen, a listbox Sv7 that sets a "master gain" is provided second from the bottom. This item determines the level of attenuation for the gamma curve. The four choices "0 dB", "−6 dB", "−12 dB", and "−18 dB", are provided.

Figure 4:
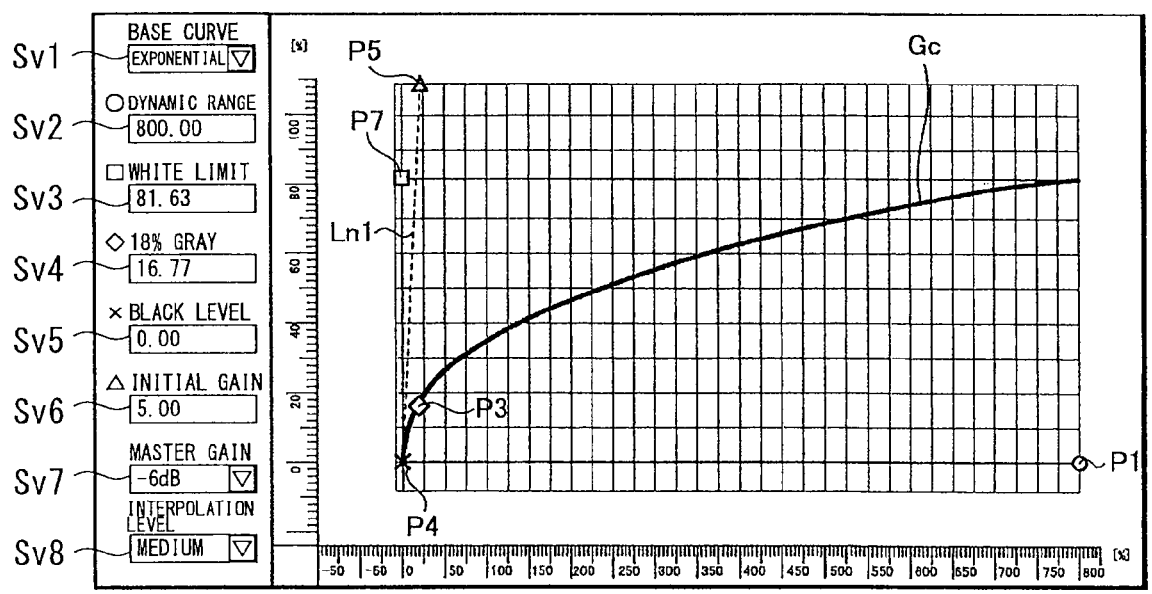
FIG. 4 is a diagram useful in explaining an example of a screen when adjusting master gain according to an embodiment of the present invention.

FIG. 4 shows an example of the gamma curve Gc in a case where "−6 dB" has been set as an example setting of the "master gain". In the graph region on the right in FIG. 4, a state is displayed where the position of the adjustment point P7 that sets the white limit has been lowered to around 80% so that the gradient of the gamma curve Gc as a whole is suppressed. That is, the level of attenuation for the gamma curve Gc is adjusted according to the value set in the "master gain".

Figure 5:
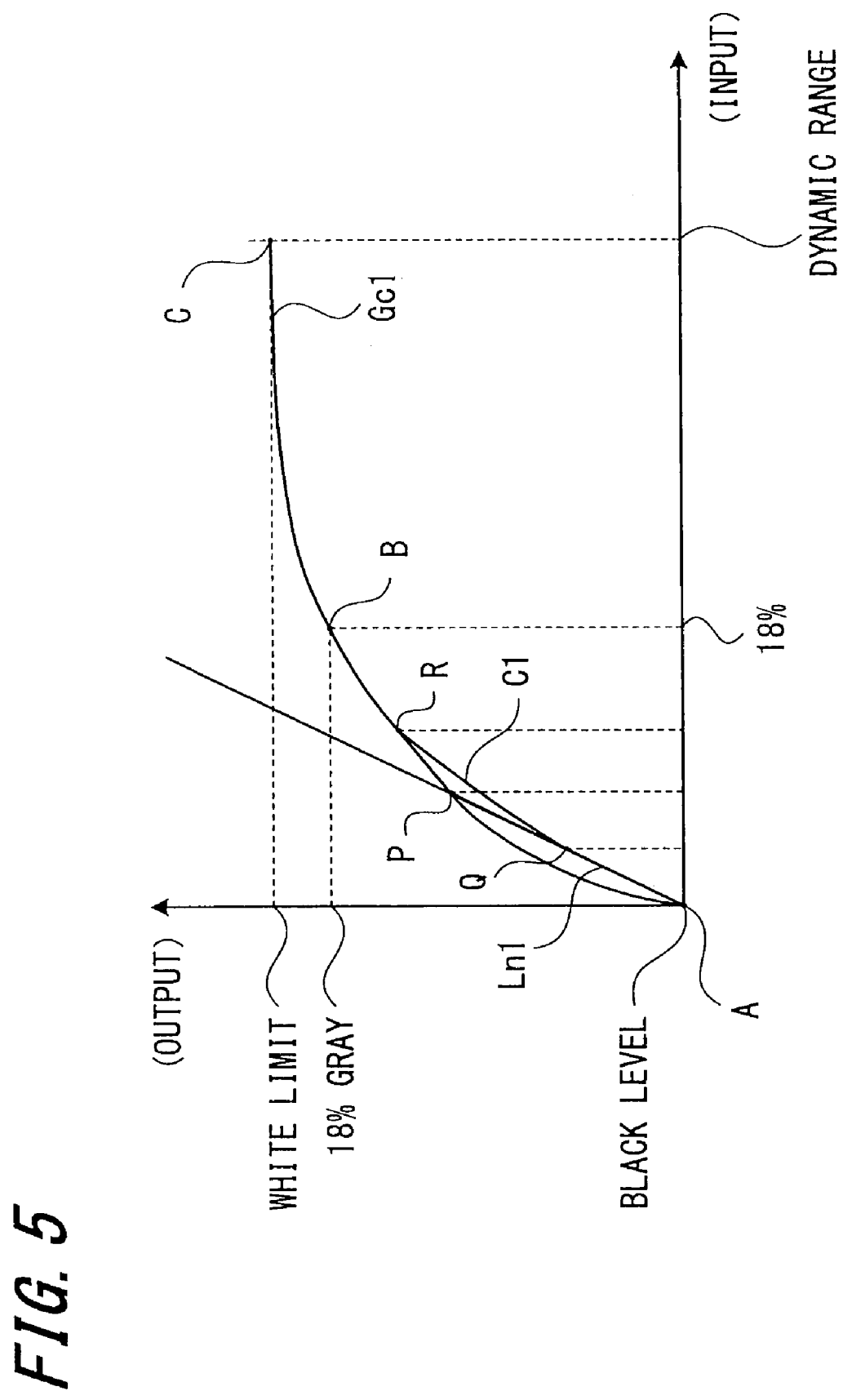
FIG. 5 is a diagram useful in explaining the relationship between various setting parameters and a gamma curve according to an embodiment of the present invention.
Figure 6:
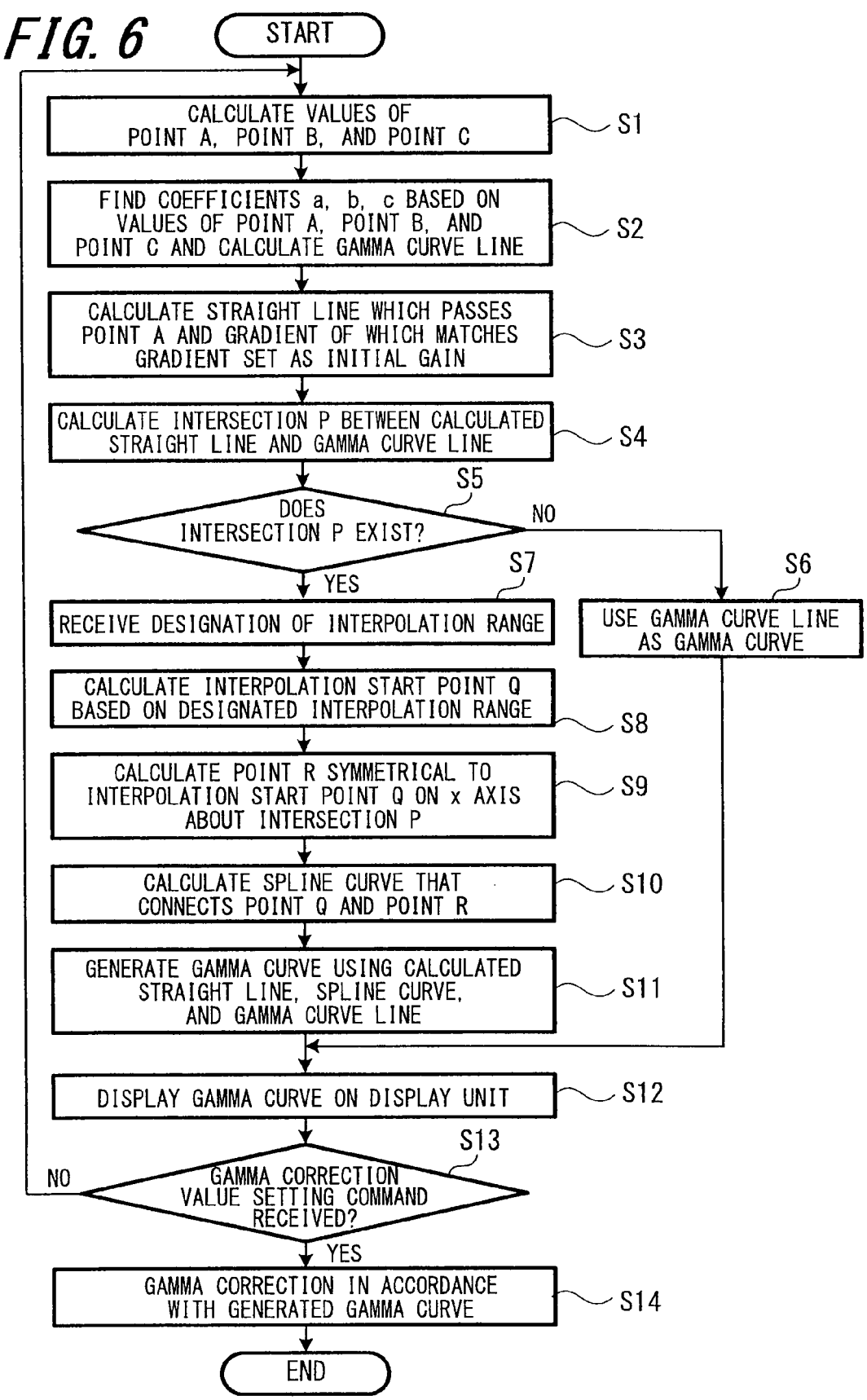
FIG. 6 is a flowchart showing one example of processing from calculation of gamma correction values up to gamma correction according to an embodiment of the present invention.

Next, the processing that generates the gamma curve Gc from the set values set via a user interface such as that described above and carries out gamma correction using the gamma curve Gc will be described with reference to the graph in FIG. 5 and the flowchart in FIG. 6. FIG. 5 is a diagram showing correspondence between the respective set values that have been set by the user and the setting parameters Pm that form the gamma curve line Gc1. The graph shown in FIG. 5 is the same as the graphs shown in FIGS. 2A to 4 in that the horizontal axis (x axis) shows the input and the vertical axis (y axis) shows the output.

In the present embodiment, the following equations are used to generate the gamma curve line Gc1.

$$y = d(a \times x^b + c) \quad \text{Equation 1}$$

$$y = d\{a \times \log(x+b) + c\} \quad \text{Equation 2}$$

Equation 1 is used when "exponential" has been selected as the type of "base curve", and Equation 2 is used when "logarithmic" has been selected as the type of "base curve".

In such equations, parameter a is found by an approximation calculation for the set value of the item "black level" (the value of the point A in FIG. 5) and parameter b is found by an approximation calculation for the set value of the item "18% gray" (the value of the point B in FIG. 5). Parameter c is found by an approximation calculation for a value of an intersection (the point C in FIG. 5) between the set value of the "dynamic range" and the set value of the "white limit". Parameter d is a coefficient that is determined in accordance with the magnitude of the value set as the "master gain". When "0 dB" has been selected as the "master gain", the coefficient d=1.

The calculation that finds the parameters a, b, c from the points A, B, and C is carried out according to the procedure described below, for example. In the following description, it is assumed that d=1.

First, starting with the calculation method in Equation 1, since the point A set as the "black level" is the intersection with the y axis in the graph, the three points can be expressed as shown below.

$$(0, y1), (x2, y2), (x3, y3)$$

When such constants are substituted into Equation 1

$$y1 = c \quad \text{Equation 3}$$

$$y2 = a \times x2^b + c \quad \text{Equation 4}$$

$$y3 = a \times x3^b + c \quad \text{Equation 5}$$

are given, and therefore the parameter c is found.
When Equation 3 is substituted into Equation 4, $$y2 = a \times x2^b + y1$$

$$y2 - y1 = a \times x2^b$$

are given, and when logarithms are taken on both sides, the following equation is given.

$$\begin{aligned}\log(y2 - y1) &= \log(a \times x2^b) \\ &= \log a + \log(x2^b) \\ &= \log a + b \times \log x2\end{aligned} \quad \text{Equation 6}$$

In the same way, when Equation 3 is substituted into Equation 5 and logarithms are taken on both sides, $$\log(y3 - y1) = \log a + b \times \log x3 \quad \text{Equation 7}$$

is given.
When Equation 7 is then subtracted from Equation 6, $$\log(y2 - y1) - \log(y3 - y1) = b \times (\log x2 - \log x3)$$

$$b = \{\log(y2 - y1) - \log(y3 - y1)\}/(\log x2 - \log x3) \quad \text{Equation 8}$$

is given, and therefore the parameter b is found.
Finally, Equation 6 is used to obtain $$\log a = \log(y2 - y1) - b \times \log x2$$

and if logarithms are taken for both sides, $$a = 10^{\{\log(y2-y1) - \log(y3-y1)\}} \quad \text{Equation 9}$$

is given. By substituting the coefficient calculated by Equation 8 into Equation 9, the parameter a is found.

Next, the method of solving the coefficients in Equation 2 as a logarithmic function will be described. In the following equations, when not specified otherwise the logarithms are to base 10. When the constants (0,y1), (x2,y2), and (x3,y3) are substituted into Equation 2

$$y1 = a \times \log b + c \quad \text{Equation 10}$$

$$y2 = a \times \log(x2+b) + c \quad \text{Equation 11}$$

$$y3 = a \times \log(x3+b) + c \quad \text{Equation 12}$$

are given. Here, when Equation 10 is subtracted from Equation 11, $$y2 - y1 = a \times \log b - a \times \log(x2 + b)$$
$$= a \times \{\log b - \log(x2 + b)\}$$

Equation 13 is given.
Here, when Equation 10 is subtracted from Equation 12, $$y3 - y1 = a \times \log b - a \times \log(x3 + b)$$
$$= a \times \{\log b - \log(x3 + b)\}$$

Equation 14 is given. When both sides of Equation 13 are divided by Equation 14, the parameter a is cancelled out and so disappears.

$$(y2-y1)/(y3-y1)=\{\log b - \log(x2+b)\}/\{\log b - \log(x3+b)\}$$

From the rules of logarithms, since $\log A - \log B = \log(A/B)$, the equation given above can be rearranged as follows.

$$(y2-y1)/(y3-y1)=\log \{b/(x2+b)\}/\log \{b/(x3+b)\}$$

Also, from the rules of logarithms, division of logs can be reduced to a single log by changing the base as shown below.

$$\log A/\log B = \log [B]A \text{ (i.e., } \log A \text{ base } B\text{)}$$

Accordingly, the equation given above can be rearranged as follows.

$$(y2-y1)/(y3-y1)=\log [b/(x3+b)]\{b/(x2+b)\}$$

Equation 15

Although it is not possible to solve this equation for the parameter b, since the equation is a logarithmic expression, it is clear that parameter b is a function that monotonically increases in the positive direction. Accordingly, a single value of the parameter b that satisfies this equation can be determined. The parameter b is calculated below via a numeric calculation of an asymptote. First, an extremely low value b1 and an extremely high value b3 are assumed and a midpoint between such values is set as b2 (b1<b2<b3).

When b1 and b3 are substituted into Equation 15, if (right side when b1 has been substituted)<(right side when b3 has been substituted)        Equation 16 is satisfied, the value b can be said to increase monotonically in Equation 15. In this case, if, when the midpoint b2 has been substituted into Equation 15, left side<right side is satisfied, it can be said that the true b is present in the interval between b2 and b3 (b1<b2<b<b3).
Conversely, if left side>right side is satisfied, it can be said that the true b is present in the interval between b1 and b2 (b1<b<b2<b3).

In this way, by repeating a procedure that gradually carries out asymptotic analysis while narrowing the interval to one half each time, b will approach its true value. At a stage where the error has become sufficiently small, the found value is used as the value of the parameter b. If Equation 16 takes the inverse inequality sign, the parameter b will monotonically decrease in Equation 15, and b may be calculated using an asymptote with the inverse inequality sign.

Next, the parameter a is found. When Equation 10 is subtracted from Equation 11, $$y2-y1=a \times \{\log(x2+b)-\log b\}$$

$$a=(y2-y1)/\{\log(x2+b)-\log b\}$$

Equation 17 is given. Since the parameter b has already been determined, the parameter a is found by substituting b into Equation 17.

Finally, the parameter c is found. Since Equation 10 gives $$c = y1 - a \times \log b$$

Equation 18 c is found by substituting the parameters a and b into Equation 18.

Note that instead of calculating the coefficients a, b, c every time as in the method described above, it is also possible to find the coefficients a, b, c using a log table or the like that is prepared in advance.

Returning to the explanation of FIG. 5, the point Q shown in FIG. 5 is optionally set at a position between the intersection P and the point A. The position of the point Q is determined by the magnitude of the value set as the "interpolation level". The point R is provided at an opposite position to the point Q in the x direction with the intersection P as an axis of symmetry. In the present embodiment, the point Q is set as the start point of the interpolation range, the point R is set as the end point of the interpolation range and the point Q and the point R are joined by a smooth curve. This curve is generated using a spline interpolation algorithm, for example.

That is, as shown in FIG. 5, the gamma curve Gc is formed of the straight line Ln1 that connects the point A to the point Q, the spline curve C1 that connects the point Q to the point R, and the gamma curve line Gc1 that joins the point B to the point C.

Next, an example of processing from calculation of the gamma correction values to the execution of actual gamma correction will be described with reference to the flowchart in FIG. 6. First, in the gamma correction value calculating unit 10 (see FIG. 1), the values of the point A, the point B, and the point C (see FIG. 5) are calculated (step S1) and, by using the coefficients a, b, and c calculated based on the point A, the point B, and the point C, the gamma curve line Gc1 is calculated (step S2). The equation used here to calculate the gamma curve line Gc1 is Equation 1 when the user has set "exponential" as the type of base curve and is Equation 2 when the user has set "logarithmic" as the type of base curve.

Next, the straight line Ln1 that passes the point A and whose gradient matches the gradient set as the "initial gain" is calculated (step S3), and the intersection P between the straight line Ln1 and the gamma curve line Gc1 is calculated (step S4). It is then determined whether the intersection P exists (step S5). When the gradient of the straight line Ln1 is steeper than the gradient of the gamma curve line Gc1, the straight line Ln1 will not contact the gamma curve line Gc1. Accordingly, no intersection P will exist. In such case, the gamma curve line Gc1 is directly used as the gamma curve Gc (step S6).

When the intersection P exists, a designation of the interpolation range is received from the user (step S7), and the position of the point Q as the interpolation start point is calculated in accordance with such range (step S8). When the "interpolation level" has been set at "off" by the user, the point Q is the intersection P. When the "interpolation level" has been set at "low", a value produced by subtracting ¼ of the input value of the intersection P (that is, a distance on the x axis from the point A to the intersection P) from the intersection P is set as the point Q. When the "interpolation level" has been set at "medium", a value produced by subtracting ⅓ of the input value of the intersection P from the intersection P is set as the point Q, while when the "interpolation level" has been set at "high", a value produced by subtracting ½ of the input value of the intersection P from the intersection P is set as the point Q. Note that the interpolation level is not limited to the four examples described above, and it is possible to set two or five levels, for example.

Next, the point R that is the opposite position to the point Q on the x axis about the intersection P is calculated (step S9), and a spline curve C1 that joins the point Q and the point R is calculated (step S10). The gamma curve Gc is formed with the straight line Ln1, the spline curve C1, and the gamma curve line Gc1 (step S11). The gamma curve Gc is stored in the gamma correction value storage unit 11 and then outputted to the display processing unit 7 and displayed on the display unit according to processing by the display processing unit 7 (step S12). The generated gamma curve Gc (gamma correction values) is also outputted to the gamma correction unit 3 (see FIG. 1).

When an operation that confirms the gamma curve Gc generated in this way is carried out by the user, a gamma correction value setting command signal Cm1 is inputted into the gamma correction value storage unit 11. In the next step S13, it is determined whether the gamma correction value setting command signal Cm1 has been received. When the gamma correction value setting command signal Cm1 has been received, the gamma correction values stored in the gamma correction value storage unit 11 are outputted to the gamma correction unit 3 and gamma correction using the gamma curve Gc is carried out by the gamma correction unit 3 (step S14). The video signal that has been subjected to gamma correction is outputted to the compression processing unit 4 (see FIG. 1) and is also outputted to the display processing unit 7.

The gamma correction value setting command signal Cm1 is not outputted until the user carries out an operation that confirms the gamma curve Gc, and during the period until such output, the processing returns to and continues from step S1.

That is, while the gamma curve Gc is being adjusted by the user, the gamma curve Gc before adjustment is used on the video signal to be stored. Once an instruction that confirms the gamma curve Gc has been received, gamma correction of the video signal to be stored is carried out using the adjusted gamma curve Gc.

The gamma curve Gc is calculated by the gamma correction value calculating unit 10 whenever a set value inputted from the user has changed, and the generated gamma curve Gc is displayed on the display unit. When the operation that confirms the gamma curve Gc has been carried out, the actual gamma correction is carried out. The instruction that confirms the gamma curve Gc can be given by an operation of pushing a button or the like.

Figure 7A:
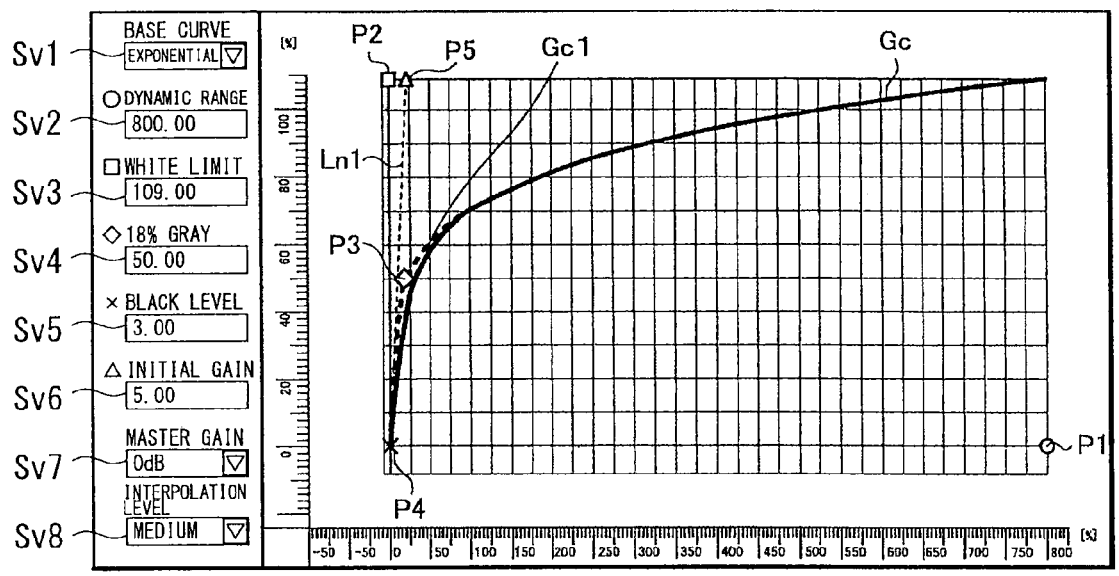
FIGS. 7A and 7B are diagrams useful in explaining example settings of a gamma curve according to an embodiment of the present invention, with FIG. 7A showing an exponent-based gamma curve and FIG. 7B showing a logarithm-based gamma curve.
Figure 7B:
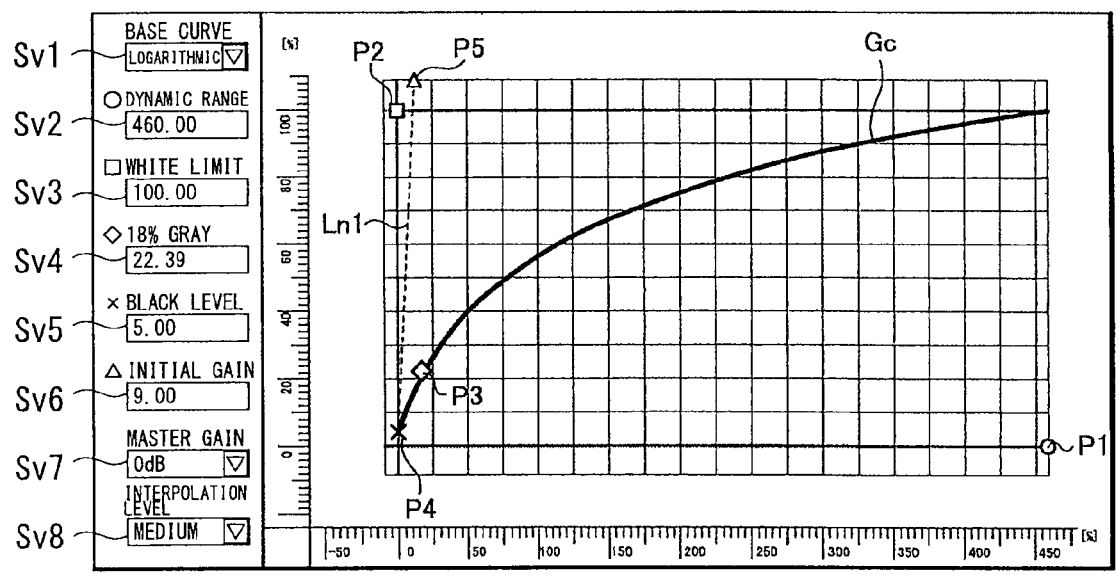

FIGS. 7A and 7B show examples of gamma curves Gc set by the processing described above. FIG. 7A shows an example setting where "exponential" has been selected as the type of "base curve", and FIG. 7B shows an example setting where "logarithmic" has been selected as the type of "base curve".

In the setting example shown in FIG. 7A, the dynamic range is set at 800%, the white limit at 109%, the output ratio of 18% gray at 50%, the output ratio of the black level at 3%, and the initial gain at five times. The gamma curve Gc generated based on such values that have been set is displayed on the graph.

In the setting example shown in FIG. 7B, the dynamic range is set at 460%, the white limit at 100%, the output ratio of 18% gray at 22.39%, the output ratio of the black level at 5%, and the initial gain at nine times. The gamma curve Gc generated based on such values that have been set is displayed on the graph.

According to the present embodiment described above, when an operation that changes the shape of the gamma curve Gc has been received from the user or values of setting parameters have been changed by the user, the gamma curve line Gc1 that forms the gamma curve Gc is calculated based on an exponential function or a logarithmic function. By doing so, natural tones will be reproduced in an image to be displayed on a display screen.

Also, according to the embodiment described above, it is also possible to adjust a gamma curve Gc produced by a logarithmic function. By doing so, it becomes easy to adjust the gamma curve Gc in an imaging apparatus that has a gamma curve with logarithmic characteristics. Accordingly, in the same way as different types of negative film are provided for different applications, such as films for low-light conditions and high-contrast films, a digital imaging apparatus becomes capable of generating a variety of gamma curves Gc in accordance with such applications.

Also, according to the embodiment described above, since the gamma curve line Gc1 is automatically generated by setting items that are easy for the user to manipulate, such as dynamic range and white limit, it is possible to improve operability for the user.

In this case, the shape of the gamma curve Gc will change in real time whenever an operation that changes a setting parameter, such as the dynamic range or the white limit, or moves an adjustment point P provided on the gamma curve Gc is carried out. By doing so, the user can set the gamma correction values while confirming the shape of the gamma curve Gc to be used during actual gamma correction.

According to the present embodiment described above, the user can optionally set the gradient of the rising part of the gamma curve Gc. That is, even when the gradient of the rising part has become steep due to a change in the shape of the gamma curve Gc, it will still be possible to select the straight line Ln1 for use in such part. Accordingly, when the shape of the gamma curve Gc has graphically changed, it is possible to improve the SNR (signal to noise ratio) of dark portions compared to an existing technology where processing that automatically connects the respective adjustment points with an interpolated curve is carried out.

Also, according to the present embodiment described above, the user can select the range of interpolation used for the part that connects the straight line Ln1 and the gamma curve line Gc1 forming the gamma curve Gc. By doing so, in dark parts of the video signal, it is possible to selectively set which, out of improvement of SNR and improvement of tone reproduction, is to be preferentially carried out and to what extent.

Note that in the present embodiment described above, although a configuration where the gamma curve Gc is also displayed on the setting screen and the shape of the gamma curve Gc can also be changed by moving the adjustment points P provided on the gamma curve Gc has been given as an example, the present invention is not limited thereto. For example, it is possible to use an arrangement where only the values of the setting parameters Pm are displayed on the screen.

An example configuration of the display screen in such case is shown in FIG. 8. At the top of the screen shown in FIG. 8, the title "GAMMA MODIFICATION PARAMETERS" shows that the screen is a setting screen for parameters used during gamma correction. Below this, "BASE CURVE $y=x^\gamma$" shows that an exponential function has been selected as the equation used to calculate the base curve. Further below, a pair of an item name of a setting parameter Pm and a set value is given for each type of setting item. For example, "CAM- ERA D-RANGE" and "800%" are given for setting item (A), with the setting item name shown on the left and the set value shown on the right. The set value can be changed by a jog dial, a knob, or the like. That is, the set value may change in accordance with the rotational speed and direction of rotation of the jog dial or knob.

By using such configuration, it is possible to display the setting screen even on a small-sized screen, such as a viewfinder (not shown) of the imaging apparatus 100. Also, since the interface resembles screens used to set other setting items, the user can set the gamma correction values via an operation that is familiar to the user.

Also, although a configuration where actual gamma correction is not carried out until an operation that confirms the gamma curve Gc has been received from the user is given as an example in the present embodiment described above, the present invention is not limited thereto. That is, another configuration can be used where it is possible, even during adjustment of the gamma curve Gc, for the user to check images showing the result of gamma correction using the gamma curve Gc that is being adjusted.

Figure 9:
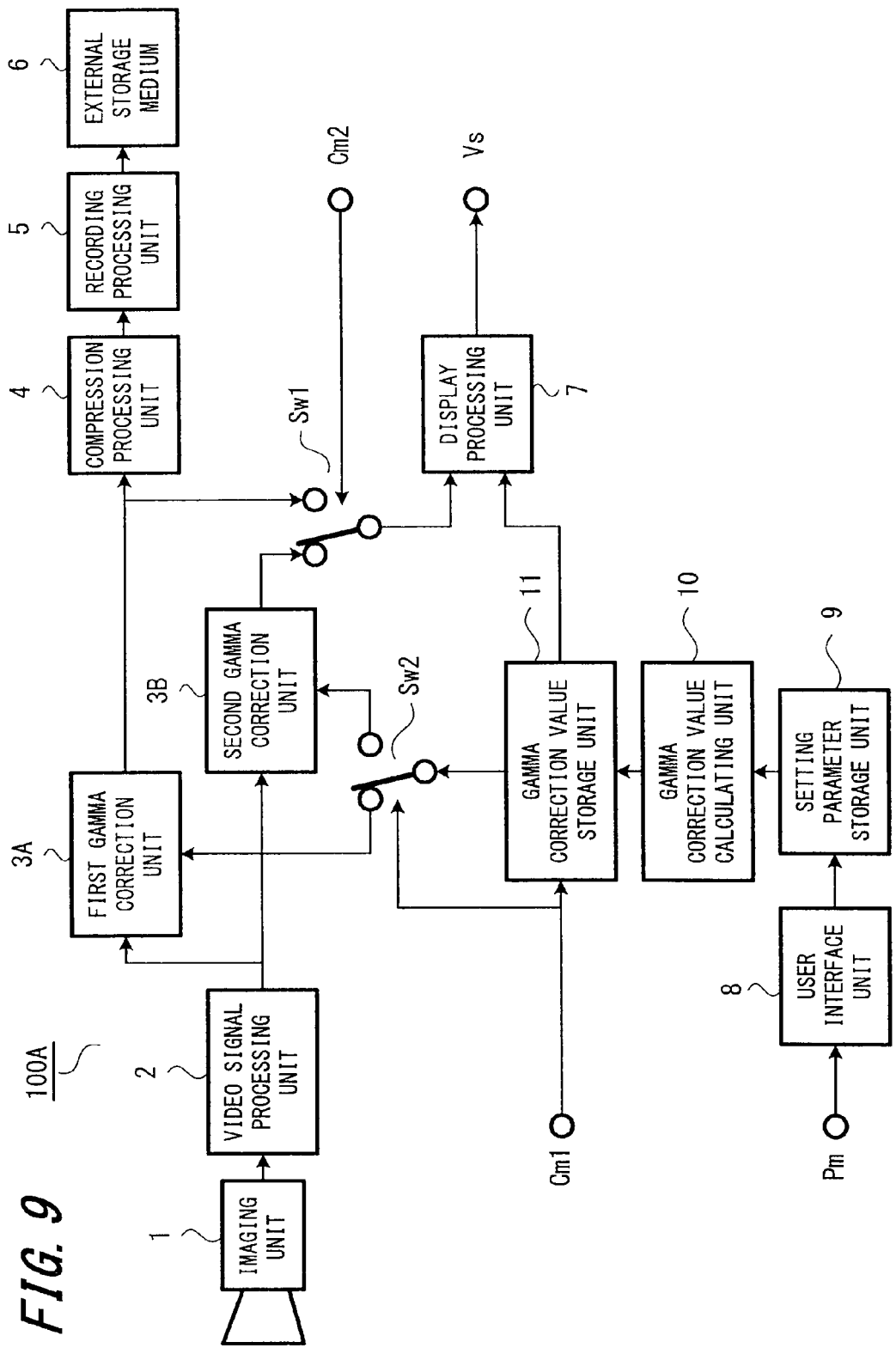
FIG. 9 is a block diagram showing another example of the internal configuration of an imaging apparatus according to an embodiment of the present invention.

FIG. 9 shows an example configuration of an imaging apparatus 100A in such case. In FIG. 9, parts that correspond to those in FIG. 1 have been assigned the same reference numerals and description thereof is omitted as appropriate. The imaging apparatus 100A includes the imaging unit 1 and the video signal processing unit 2, and is formed so that a video signal subjected to signal processing by the video signal processing unit 2 is outputted to both a first gamma correction unit 3A and a second gamma correction unit 3B. That is, gamma correction is carried out on a video signal for storage purposes by the first gamma correction unit 3A and gamma correction is carried out on a video signal for display purposes by the second gamma correction unit 3B.

More specifically, the imaging apparatus 100A is formed so that the video signal subjected to gamma correction processing by the first gamma correction unit 3A is outputted to the compression processing unit 4 and the video signal subjected to gamma correction processing by the second gamma correction unit 3B is outputted via the display processing unit 7 to the display unit.

A switch Sw1 with two fixed contacts is provided between the second gamma correction unit 3B and the display processing unit 7. One fixed contact of the switch Sw1 is connected to the first gamma correction unit 3A and the other fixed contact is connected to the second gamma correction unit 3B. Based on a display video switching signal Cm2 generated in accordance with an operation content inputted from the user, the unit connected to the switch Sw1 is switched.

The setting parameters Pm inputted from the user into the user interface unit 8 are outputted to the gamma correction value calculating unit 10 after first being stored in the setting parameter storage unit 9. In the gamma correction value calculating unit 10, gamma correction values are calculated based on the setting parameters Pm and the calculated values are stored in the gamma correction value storage unit 11.

The gamma correction value storage unit 11 is connected to a switch Sw2 with two fixed contacts. One of the fixed contacts of the switch Sw2 is connected to the first gamma correction unit 3A and the other fixed contact is connected to the second gamma correction unit 3B. Based on the gamma correction value setting command signal Cm1 generated in accordance with an operation content inputted from the user, the unit connected to the gamma correction value storage unit 11 is switched. The gamma correction value storage unit 11 is also connected to the display processing unit 7, and the gamma curve Gc showing the gamma correction values stored in the gamma correction value storage unit 11 is displayed on the display unit based on the processing of the display processing unit 7.

In the imaging apparatus 100A configured as described above, until the gamma correction value setting command signal Cm1 is inputted to confirm the gamma correction values, the fixed contacts of the switch Sw1 and the switch Sw2 are connected to the second gamma correction unit 3B. By doing so, even when the user is adjusting the gamma curve Gc, the user will be able to constantly check, via the display unit, images that are the result of gamma correction using the gamma curve Gc being adjusted.

After this, when an operation that confirms the gamma correction values has been carried out, the switch Sw1 and the switch Sw2 switch so as to be connected to the first gamma correction unit 3A. By doing so, gamma correction is carried out on the video signal for storage purposes by the first gamma correction unit 3A, the video signal after gamma correction is recorded on the external storage medium 6 and is also displayed on the display unit.

Also, examples where a video signal processing apparatus according to the present invention is applied to an imaging apparatus are given in the embodiments described above. It is also possible to apply the present invention to a configuration where the processing up to the calculation of the gamma correction values is carried out by a personal computer (hereinafter simply "PC") and gamma correction is carried out by an imaging apparatus using the gamma correction values outputted from the PC.

Figure 10:
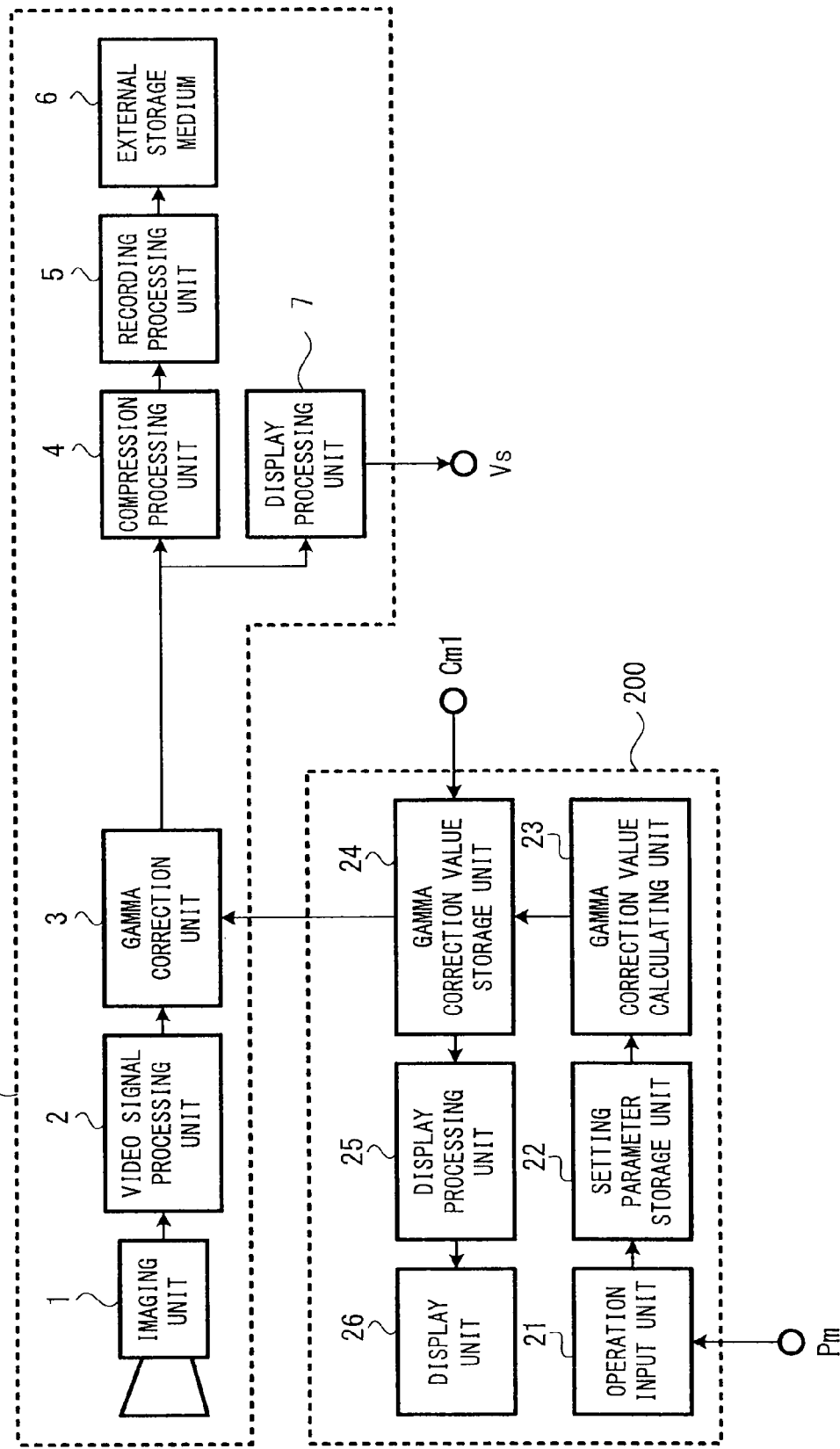
FIG. 10 is a block diagram showing another example of the internal configuration of a system according to an embodiment of the present invention.

FIG. 10 shows an example configuration of a system in such case. The system shown in FIG. 10 includes an imaging apparatus 100B and a PC 200. The imaging apparatus 100B includes the imaging unit 1, the video signal processing unit 2, the gamma correction unit 3, the compression processing unit 4, the recording processing unit 5, the external storage medium 6, and the display processing unit 7. The PC 200 includes an operation input unit 21, which is a keyboard, a mouse, or the like and receives input of the setting parameters Pm, and a setting parameter storage unit 22 that stores the setting parameters Pm inputted via the operation input unit 21. The PC 200 also includes a gamma correction value calculating unit 23 that calculates gamma correction values using the setting parameters Pm and a gamma correction value storage unit 24 that stores the gamma correction values calculated by the gamma correction value calculating unit 23.

A display processing unit 25 carries out processing for displaying the gamma correction values stored in the gamma correction value storage unit 24 as the gamma curve Gc and outputs images after processing to a display unit 26. When the gamma correction value setting command signal Cm1 is inputted, the gamma correction value storage unit 24 reads out the stored gamma correction values and outputs the gamma correction values to the gamma correction unit 3 of the imaging apparatus 100B.

In the system configured as described above, until the gamma correction values are confirmed, that is, while adjustment of the gamma curve Gc is being carried out, the gamma curve Gc during adjustment is displayed on the display unit 26 of the PC 200. That is, whenever the value of a setting parameter Pm inputted from the user changes, the shape of the gamma curve Gc displayed on the display unit 26 will also change in accordance with the change in the value. Also, when adjustment of the gamma curve Gc has been completed, the gamma correction value setting command signal Cm1 is generated based on an operation input from the user and according to this signal Cm1, the gamma correction values are outputted to the gamma correction unit 3 of the imaging apparatus 100B.

According to such configuration and processing, since the processing that calculates the gamma correction values is carried out by the PC 200, gamma correction values can be calculated at high speed. It also becomes possible to adjust the gamma curve Gc on the large screen of a display unit that is connected to the PC 200.

Note that although in the configuration shown in FIG. 10 gamma correction is carried out by the imaging apparatus 100B using the gamma correction values after adjustment, according to another example, gamma correction is carried out by the PC 200 and the video signal after correction is outputted to the imaging apparatus 100B.

Also, although an example where processing that joins the straight line Ln1 and the gamma curve line Gc1 using a spline curve is carried out as processing at the rising part of the gamma curve Gc in the case where the straight line Ln1 and the gamma curve line Gc1 intersect has been given in the embodiment described above, the present invention is not limited thereto. For example, it is possible to carry out processing that shifts the gamma curve line Gc1 to the right in the graph as far as a position where the gradients of the straight line Ln1 and the gamma curve line Gc1 match.

Also, the series of processing carried out by the video signal processing apparatus described above can be carried out by hardware and can be carried out by software. It should also be obvious that a function that carries out such processing may be realized by a combination of hardware and software. When the series of processing can be carried out by software, a computer program constituting such software is installed from a program recording medium into a computer equipped with special-purpose hardware or a computer, such as a general-purpose computer, that is capable of carrying out various types of functions when various types of computer program are installed.

Also, although an example where the interface screen is formed of a display unit has been given in the embodiments described above, it is also possible to display setting screens on a projector screen or the like using projected light from a projector or the like.

The present application contains subject matter related to that disclosed in Japanese Priority Patent Application JP 2008-101976 filed in the Japan Patent Office on Apr. 9, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A video signal processing apparatus, comprising:
a user interface unit that receives a designation of values of at least three points that form a gamma curve used during gamma correction of a video signal;
a gamma correction value calculating unit that calculates gamma correction values by substituting coefficients, which are obtained by an approximation calculation carried out on the values of the at least three points, into a selected one of an exponential function and a logarithmic function, each of which uses the coefficients as parameters and each of which is displayed as an option, via the user interface unit, from which the selected one is selected; and
a gamma correction value storage unit that stores the gamma correction values calculated by the gamma correction value calculating unit and is operable when an indication, that specifies the gamma correction values have been confirmed by a user, is received, to output the gamma correction values to a gamma correction unit that carries out processing for gamma correction,
wherein the gamma curve is determined based on a first curve determined by substituting the coefficients into one of the exponential function and the logarithmic function and a straight line that has the first point as an origin and a gradient determined by a value of an initial gain, which determines the gradient of a rising part of the gamma curve and is inputted via the user interface unit.

2. The video signal processing apparatus according to claim 1,
wherein the user interface unit receives settings of an output ratio for a black level portion of the video signal, an output ratio for an intermediate tone portion of the video signal, a dynamic range of an input video signal, and a white clip level of an output video signal, and
wherein the at least three points that form the gamma curve are a first point determined by a set value of the output ratio of the black level portion, a second point determined by a set value of the intermediate tone portion of the video signal, and a third point determined by set values of the dynamic range of the input video signal and the white clip level of the output video signal.

3. The video signal processing apparatus according to claim 2,
wherein the user interface unit includes a display unit that displays the gamma curve formed by the gamma correction values calculated by the gamma correction value calculating unit.

4. The video signal processing apparatus according to claim 3,
wherein the gamma correction value calculating unit is operable when the user has designated an exponential function as a function used to calculate the gamma correction values, to use an equation $y=a \times x^b + c$ as the exponential function, to substitute a value obtained by an approximation calculation of the value designated as the first point into a, to substitute a value obtained by an approximation calculation of the value designated as the second point into b, and to substitute a value obtained by an approximation calculation of the value designated as the first point into c.

5. The video signal processing apparatus according to claim 4,
wherein the gamma correction value calculating unit is operable when the user has designated a logarithmic function as a function used to calculate the gamma correction values, to use an equation $y=a \times \log(x+b)+c$ as the logarithmic function, to substitute a value obtained by an approximation calculation of the value designated as the first point into a, to substitute a value obtained by an approximation calculation of the value designated as the second point into b, and to substitute a value obtained by an approximation calculation of the value designated as the first point into c.

6. The video signal processing apparatus according to claim 5,
wherein the gamma correction value calculating unit is operable when a set value of master gain has been inputted by the user, to multiply a coefficient in the equation based on the set value of the master gain.

7. The video signal processing apparatus according to claim 3,
wherein the gamma correction value calculating unit calculates a midpoint between (i) an intersection between the first curve and the straight line and (ii) the first point, calculates a fourth point that is symmetrical to the midpoint with the intersection as an axis of symmetry, and calculates an interpolated curve that connects the midpoint and the fourth point.

8. The video signal processing apparatus according to claim 7,
wherein the interpolated curve is a spline curve.

9. The video signal processing apparatus according to claim 7,
wherein the gamma correction value calculating unit changes a start point for a calculation of the interpolated curve within a range from the intermediate point to the fourth point in accordance with a level showing the width of an interpolation range inputted via the user interface unit.

10. The video signal processing apparatus according to claim 7,
wherein the gamma correction value calculating unit is operable when the intermediate point is not found, to output the gamma correction value shown by the first curve to the gamma value storage unit.

11. The video signal processing apparatus according to claim 2,
wherein the second point is determined by a set value of a video signal output ratio of an intermediate tone with a reflectance of 18%.

12. An imaging apparatus comprising:
an imaging unit that generates a video signal by carrying out photoelectric conversion on light from a subject;
a user interface unit that receives a designation of values of at least three points that form a gamma curve used during gamma correction of the video signal;
a gamma correction value calculating unit that calculates gamma correction values by substituting coefficients, which are obtained by an approximation calculation carried out on the values of the at least three points, designation of which is received by the user interface unit, into an exponential function that uses the coefficients as parameters;
a gamma correction value storage unit that stores the gamma correction values calculated by the gamma correction value calculating unit and is operable when an indication, that specifies the gamma correction values have been entered by a user and confirmed by the user, is received, to output the gamma correction values; and
a gamma correction unit that carries out gamma correction on the video signal using the gamma correction values outputted from the gamma correction value storage unit and outputs a gamma-corrected video signal to an external storage medium when the indication is received,
wherein the user interface unit includes a display unit that displays the gamma curve formed of the gamma correction values calculated by the gamma correction value calculating unit,
wherein the gamma correction unit includes a first gamma correction unit that outputs the gamma-corrected video signal to the external storage medium that records the video signal and a second gamma correction unit that outputs the gamma-corrected video signal to the display unit,
wherein the imaging apparatus further includes a switching unit that switches a destination of output from the gamma correction value storage unit between the first gamma correction unit and the second gamma correction unit, and
wherein the switching unit is operable, when the indication specifies that the gamma correction values have been confirmed by the user is received, to connect to the first gamma correction unit.

13. An imaging apparatus comprising:
an imaging unit that generates a video signal by carrying out photoelectric conversion on light from a subject;
a user interface unit that receives a designation of values of at least three points that form a gamma curve used during gamma correction of the video signal;
a gamma correction value calculating unit that calculates gamma correction values by substituting coefficients, which are obtained by an approximation calculation carried out on the values of the at least three points, designation of which is received by the user interface unit, into a logarithmic function that uses the coefficients as parameters;
a gamma correction value storage unit that stores the gamma correction values calculated by the gamma correction value calculating unit and is operable when an indication, that specifies the gamma correction values have been entered by a user and confirmed by the user, is received, to output the gamma correction values;
a gamma correction unit that carries out gamma correction on the video signal using the gamma correction values outputted from the gamma correction value storage unit and outputs a gamma-corrected video signal to a display unit of the user interface unit when the indication is not received; and
a switching unit that switches, in real-time, a destination of output from the gamma correction value storage unit and displays the gamma-corrected video signal, based on whether the indication is received.

* * * * *